Feb. 19, 1952  V. SANTARELLI  2,586,266
SPRAYER
Filed July 9, 1945  2 SHEETS—SHEET 1
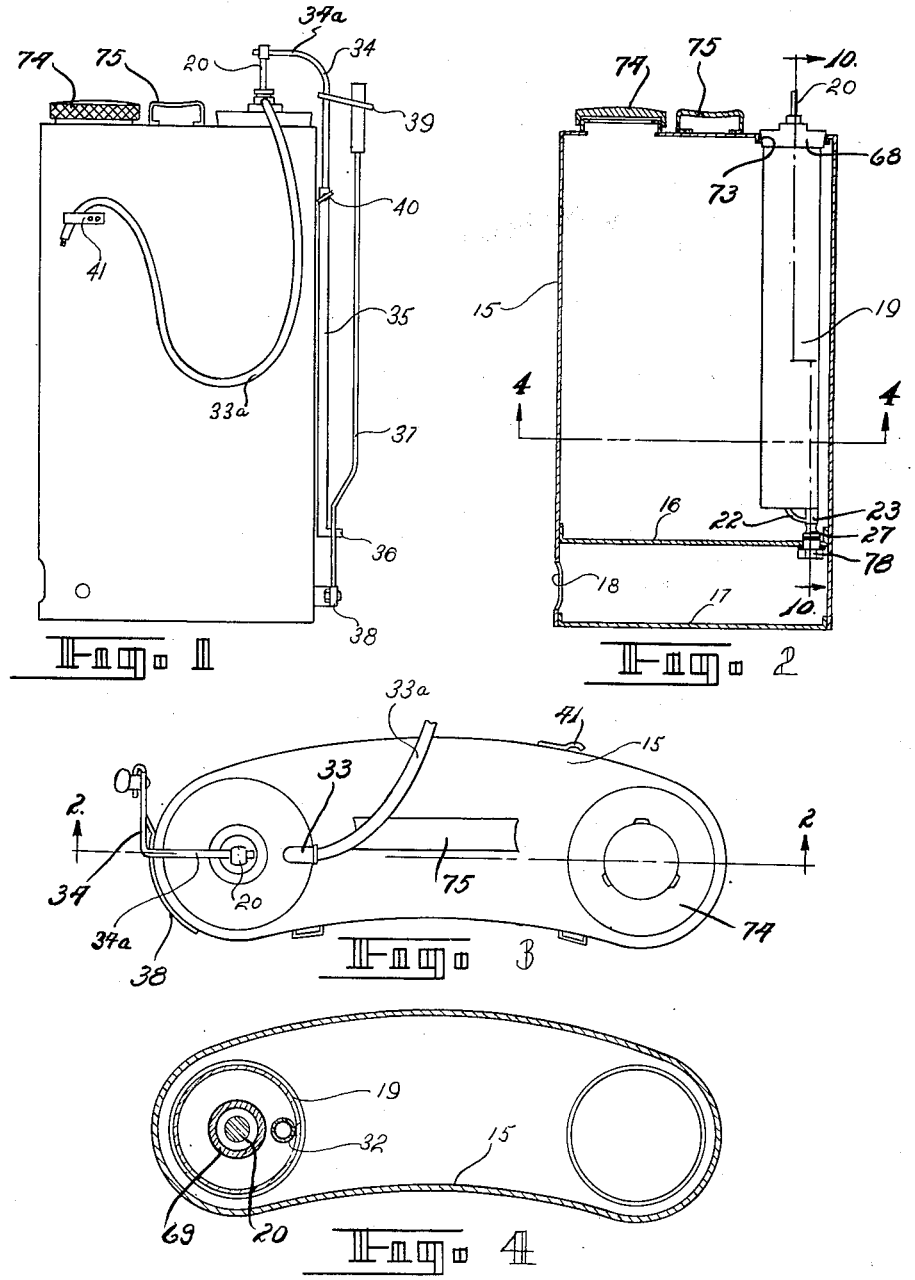
INVENTOR.
VINCENT SANTARELLI
BY Thos. Donnelly

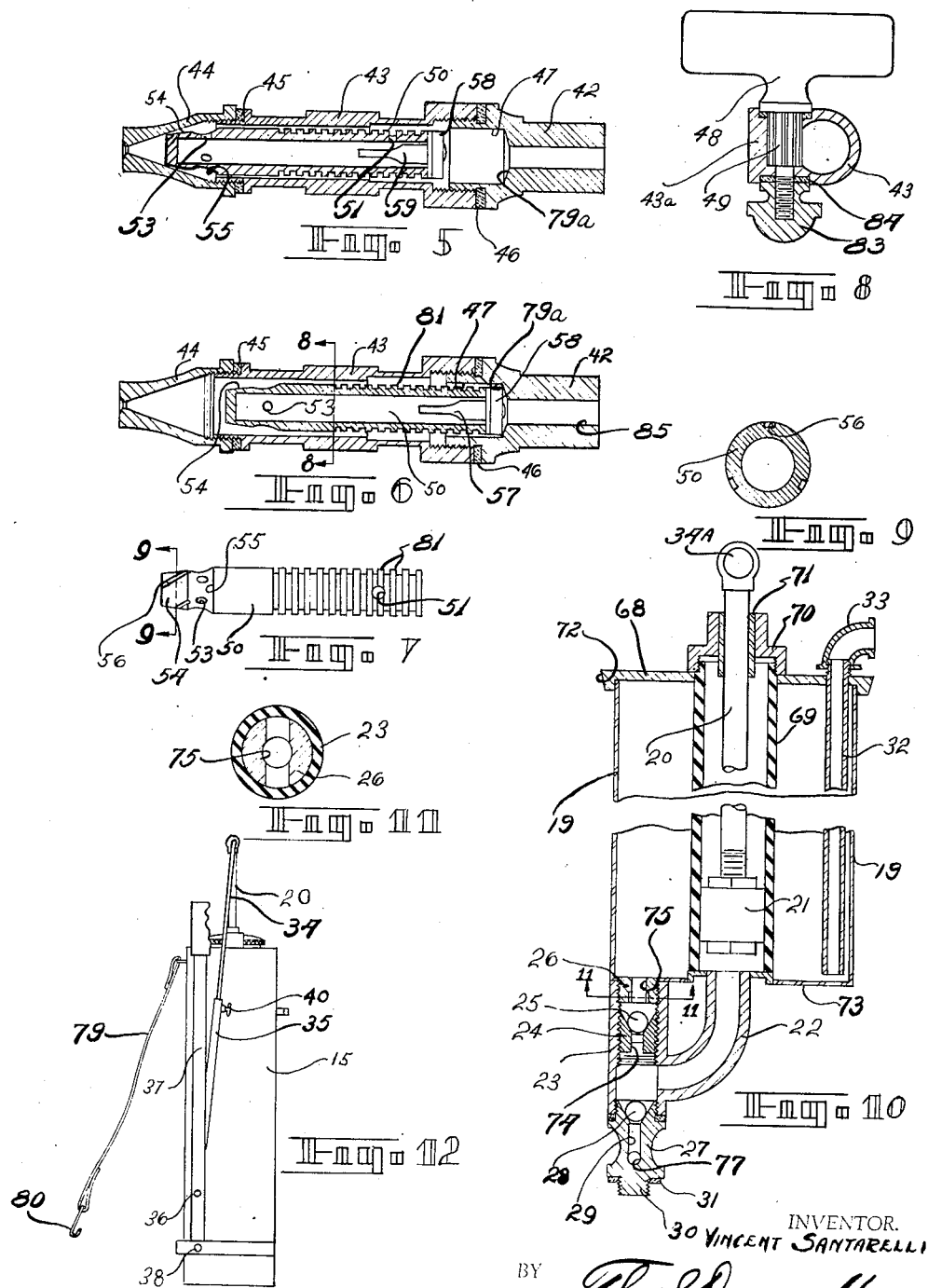

Patented Feb. 19, 1952

2,586,266

UNITED STATES PATENT OFFICE 2,586,266

SPRAYER

Vincent Santarelli, Detroit, Mich.

Application July 9, 1945, Serial No. 603,971

3 Claims. (Cl. 299—99)

1

My invention relates to a new and useful improvement in a spraying mechanism adapted for use in spraying liquids and in pumping the same from a container.

It is an object of the present invention to provide a device of this class which will be simple in structure, economical of manufacture, durable, compact, and highly efficient in use.

Another object of the invention is the provision in a device of this class of a pumping mechanism so arranged and constructed that maximum pressure may be obtained and a large volume of outflow procured.

Another object of the invention is the provision in a device of this class of a pumping mechanism which will be self-contained and which may be inserted in a container while pumping liquids therefrom under pressure.

Another object of the invention is the provision in a mechanism of this type of a self-contained pumping mechanism so constructed and arranged that it may be easily and quickly inserted in container and mounted to position therein.

Another object of the invention is the provision in a device of this class of a pumping mechanism having double handle for reciprocating the plunger and provided with connections to the plunger which may be telescoped when it is desired to pack the device when not in use.

Another object of the invention is the provision in a device of this class of a nozzle whereby a fine mist or spray may be obtained and whereby a steady stream of liquid may be obtained depending upon the adjustment of the nozzle.

Another object of the invention is the provision of a spray nozzle so arranged and constructed that it may be easily and quickly adjusted to provide different forms of liquid streams from the nozzle.

Another object of the invention is the provision in a nozzle of an outer casing and an inwardly moving plunger which may be moved to various positions to provide different types of liquid streams from the nozzle.

Another object of the invention is the provision in a device of this class of an outlet nozzle having an outer casing and a slidable plunger within the casing and movable longitudinally thereof through a rotating member.

Other objects will appear hereinafter.

It is recognized that various modifications and changes may be made in the detail of structure illustrated without departing from the invention and it is intended that such variations and

2 modifications may be embraced within the claims which form a part hereof.

Forming a part of this application are drawings in which:

Fig. 1 is a front elevational view of the invention,

Fig. 2 is a sectional view taken on a line substantially as indicated by line 2—2 of Fig. 3, Fig. 3 is a top plan view of the invention, Fig. 4 is a sectional view taken on a line substantially as indicated by line 4—4 of Fig. 2, slightly enlarged, Fig. 5 is a longitudinal central vertical sectional view of a nozzle, showing one position of adjustment, Fig. 6 is a sectional view of the nozzle similar to Fig. 5, and showing another position of adjustment, Fig. 7 is a side elevational view of the adjusting core used in the nozzle, Fig. 8 is a sectional view taken on line 8—8 of Fig. 6, Fig. 9 is a slightly enlarged sectional view taken on line 9—9 of Fig. 7, Fig. 10 is a slightly enlarged fragmentary sectional view taken on line 10—10 of Fig. 2, with parts broken away, Fig. 11 is a slightly enlarged sectional view taken on line 11—11 of Fig. 10, Fig. 12 is a side elevational view of the invention showing the plunger connecting mechanism adjusted to full length.

In the drawings I have illustrated the invention used with a tank or container 15 in which a suitable liquid or solvent may be deposited. The walls of this container 15 are extended below the bottom 16 and an auxiliary bottom 17 is provided to form a compartment, access to which is afforded through the opening 18. This compartment will afford a place for storing a hose which is used with the invention.

A pumping mechanism is used with the invention and this pumping mechanism may be inserted into the container or removed therefrom for use with a separate container. The pumping mechanism is of the pressure type but the tank or container into which the liquid is deposited is not necessary in order that pressure may be built up as the pump is provided with a tank or container 19 into which the liquid is pumped and from which it is pumped under pressure. The container 19 may be properly termed a pump chamber. This pump chamber 19 is provided with a top or cover 68 through which is extended the pump cylinder 69 having a threaded end on which the gland 70 is threaded to retain the packing 71 in close fit about the piston rod 20 which projects therethrough and which is attached at its inner end to a piston 21 slidably mounted in the cylinder 69. This cylinder 69 is in communication through the pipe 22 with the interior of a housing or fitting 23 and positioned in this housing 23 is a valve seat 24 having an opening 74 formed therethrough. A ball 25 is adapted to engage the valve seat 24 and close the passage or opening 74 therethrough. Threaded into the upper end of the housing 23 is a collar 26 having a passage 75 formed therethrough. The collar 26 is threaded into the bottom 73 of the pump barrel 19. Threaded into the lower end of the housing 23 is a fitting 27 having a passage 29 formed therein communicating through a lateral opening 77 with the interior of the container 15 in which the pumping mechanism is positioned. This fitting 27 is provided with a valve seat on which rests a ball valve 28 which serves to close the passage 29. A nipple 30 projecting downwardly from the fitting 27 projects through the bottom 16 of the container 15. This nipple 30 is threaded for reception of a nut 78 which serves to clamp the bottom 16 against the gasket 31 and provide a leak-proof connection.

The construction is such that as the piston 21 is reciprocated in the cylinder 69 the ball valves 25 and 28 alternately open and close. On the upward stroke of the piston 21 the ball 28 is raised from its seat while the ball 25 is forced or pulled downwardly onto its seat. On the upward stroke of the piston 21 liquid is drawn inwardly through the passage 77 and 29. On the downward stroke of the piston the liquid is forced against the ball valve 28 which moves onto its seat and the liquid under pressure serves to raise the ball 25 off its seat and passes upwardly through the passage 75 into the interior of the pump barrel 19.

As the liquid is forced into the pump barrel 19 a pressure will be built up and the liquid may then flow outwardly through the pipe 32 which communicates with the interior of the pump barrel 19. An elbow 33 affords a means for connecting a nose 33A in communication with the pipe 32.

Connected to the upper end of the piston rod 20 is a rod 34 having the angularly turned end 34A. This rod 34 telescopes with a tubular rod 35 having the angularly turned end 36 which is projected through an opening in the rocking arm 37 which is pivotally mounted at its lower end to a bracket 38 which is mounted on and projects outwardly from the tank 15. When the rod 34 is telescoped in the tube 35 it may be locked in position by the set screw 40 and a clip 39 may be fastened around the rod 34 and the member 37 to retain these parts in parallel closely spaced apart position.

When it is desired to operate the mechanism the rod 34 is drawn outwardly of the tube 35, as shown in Fig. 12, and locked in the proper position by set screw 40. A rocking of the arm 37 will then effect a reciprocation of the piston rod 20 to accomplish the desired pumping. The use of the telescoping rod 34 makes it possible to reduce the device to a compact form when it is not operating.

As shown in Fig. 1, and Fig. 2, the container 15 is provided with a handle 75 and with a cover 74 which covers the inlet opening. This container is also provided with a strap, as shown in Fig. 12, the strap 79 having a hook 80 at its free end. The operator would carry the container 15 by hooking the hooks on the lower edge of the container 15 and the straps extending over the back.

The hose 33A may be fastened in the bracket 41 when it is desired to transport the mechanism with the hose 33A attached to the elbow 33.

A nozzle is used on the end of the hose 33A and in the present invention I have used a novel type of nozzle comprising a fitting 42 which is attached to the end of the hose 33A. This fitting 42 is threaded into one end of a housing 43 so as to compress the gasket 46. Fitted on the opposite end of the housing 43 is a tip 44 which serves to compress the gasket 45. The chamber 47 is formed in the fitting 42 in communication with the interior of the housing 43. The end of this chamber is provided with a valve seat 79. Positioned in the housing 43 is a tubular adjusting core 50 having a plurality of circumferentially directed ribs 81 formed thereon which serve to provide rack teeth. Formed on one side of the housing 43 is an enlargement 43A having an opening in which is positioned a pinion 49 on which is mounted a head 48 whereby the pinion 49 may be rotated. A gasket 84 and a nut 83 threaded on the threaded ends of the pinion 49 serve as a means for mounting pinion on the housing enlargement 43A. The pinion 49 and the teeth 81 on the core 50 operate as a rack bar and pinion, a rotation of the member 49 effecting a longitudinal slidable movement of the core 50 in the housing 43.

The adjusting barrel or tube 50 is provided adjacent its rear end with a plurality of inlet openings 51 through which water may enter into the interior thereof. A plurality of outlet openings 53 are formed at the forward end of the adjusting barrel or tube 50. The end of this barrel or tube 50 is tapered as at 54 to provide a valve surface. Formed spirally in this surface 54 are grooves 56 communicating with a peripheral groove 55 in which the openings 53 are formed. Loosely positioned in the rear open end of the barrel 50 is a valve stem 57 on which is mounted the valve head 58. This valve head 58 is of a size that it may close the barrel 50 at its open end. The bottom of the chamber 47 is provided with a valve face 79a against which the valve 58 may engage.

Construction is such that when water is delivered under pressure through the bore 85 of the fitting 42 and the parts are moved to the position shown in Fig. 6, the valve 58 will serve to effectively close the passage 85 and prevent passage of water therethrough thus the operator may by rotating the head 48 shut off the flow of water through the hose and nozzle. If the operator desires to deliver through the nipple 44 of the nozzle a quantity of liquid the head 48 would be rotated so as to slide the adjusting barrel 50 to the proper position. This adjusting barrel 50 moves to the left of the position shown in Fig. 6, the valve 58 will move off of its seat and liquid would be permitted to enter chamber 47 and then flow around the barrel 50 into the housing 43. A quantity of the liquid would also flow through the opening 51 into the barrel 50 and outwardly through the openings 53. Should the member 50 be moved but a slight distance to the left of the position shown in Fig. 6, a stream of liquid would be delivered from the nipple 54 as this movement continues toward the position shown in Fig. 5, this stream of liquid would be cut down and an atomization or breaking up of the stream would take place. When the valve is moved to its fully adjusted position shown in Fig. 5, the surface 54 cooperating with the conical inside walls of the nipple 44 would operate as a valve and the only escape for the liquid would be through the spirally arranged passages or grooves 56. This would result in the delivery of a very fine spray or mist from the nipple 44. Thus it is possible by moving the barrel 50 longitudinally of the housing 43 to adjust the stream of liquid emitted from the nipple 44 from a steady stream to a very fine mist. This is important particularly if the device is used for spraying a solution on plants and the like. It is also important that a steady stream or full flow of liquid be permitted when it is desired to reach high places such as the tops of trees or when it is intended to use the device as a fire fighting apparatus.

It will be noted that the nozzle may be very easily and quickly taken apart and placed together thus making it possible to clean and adjust or repair the various parts of the nozzle.

Experience has shown that with a spray device constructed as illustrated a very economical structure is provided and one which will function most efficiently.

What I claim as new is:

1. A nozzle of the class described, comprising: a hollow housing; an outlet tip mounted on one end of said housing and communicating with the interior thereof and provided with an outlet opening in its end and having its inner surface tapered toward said end; a tubular adjusting core closed at one end and open at the other and longitudinally movable in said housing and provided adjacent its closed end with an outlet opening, opening laterally therethrough and having a portion at said closed end provided with a tapered peripheral surface movable into engagement with the tapered surface of said tip to form a valve, said tapered surface of said core having a plurality of circumferentially spaced, spirally directed grooves formed therein for permitting passage of liquid therethrough upon engagement of the end of said core with the tapered surface of said tip.

2. A nozzle of the class described, comprising: a hollow housing; an outlet tip mounted on one end of said housing and communicating with the interior thereof and provided with an outlet opening in its end and having its inner surface tapered toward said end; a tubular adjusting core closed at one end and open at the other and longitudinally movable in said housing and provided adjacent its closed end with an outlet opening, opening laterally therethrough and having a portion at said closed end provided with a tapered peripheral surface movable into engagement with the tapered surface of said tip to form a valve, said tapered surface of said core having a plurality of circumferentially spaced, spirally directed grooves formed therein for permitting passage of liquid therethrough upon engagement of the end of said core with the tapered surface of said tip, there being an inlet opening adjacent the open end of said core; a closure for the open end of said core; teeth-forming members on said core; and a rotatable tooth-bearing member engaging with said teeth-forming members on said core for effecting longitudinal movement of said core in said housing.

3. A nozzle of the class described, comprising: a hollow housing having a rear end and a forward end, the inside diameter of said housing being enlarged adjacent its rear end; an outlet tip on the forward end of said housing and communicating with the interior thereof and provided with an outlet opening in its end and having a conical inner surface tapering toward said end; a valve seat formed on the rearward end of said housing around an inlet opening; a hollow adjusting core slidably mounted in said housing and movable longitudinally thereof and having a closed end provided with a tapered peripheral surface and having in its periphery circumferentially spaced apart spiral grooves and engageable at its periphery with the conical surface of said tip for cooperating therewith for preventing escape of liquid from said housing through said tip except through said grooves; a valve carried on the rear end of said core for engaging with said valve seat and closing said inlet opening upon slidable movement of said core rearwardly a predetermined distance, said valve also forming a closure for the rear end of said core, there being an opening laterally into said core adjacent its rear end and communicating with the housing at the portion having the larger diameter, and there being outlet openings in the forward end of said core communicating the housing therewith; and a handle exterior of said housing for moving said core longitudinally of said housing in either direction.

VINCENT SANTARELLI.

REFERENCES CITED

The following references are of record in the file of this patent:

UNITED STATES PATENTS

| Number | Name | Date |
|---|---|---|
| 191,934 | Clifford et al. | June 12, 1877 |
| 294,675 | Richter | Mar. 4, 1884 |
| 399,654 | Clifford | Mar. 10, 1889 |
| 685,586 | Ellis | Oct. 29, 1901 |
| 860,259 | Smith | July 16, 1907 |
| 924,501 | Sala | June 8, 1909 |
| 1,345,598 | Johnson et al. | July 6, 1920 |
| 1,490,164 | Edholm | Apr. 15, 1924 |
| 1,506,819 | Edgell | Sept. 2, 1924 |
| 1,518,449 | Plantinga | Dec. 9, 1924 |
| 1,631,167 | Tereau | June 7, 1927 |
| 2,118,194 | Hukari | May 24, 1938 |
| 2,238,521 | Gustafson | Apr. 15, 1941 |
| 2,267,897 | Carrico | Dec. 30, 1941 |